(12) United States Patent
Fowler

(10) Patent No.: US 6,692,071 B2
(45) Date of Patent: Feb. 17, 2004

(54) SIDE IMPACT ACTIVE HEAD RESTRAINT

(75) Inventor: Thomas J. Fowler, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/071,609

(22) Filed: Feb. 8, 2002

(65) Prior Publication Data

US 2003/0151279 A1 Aug. 14, 2003

(51) Int. Cl.⁷ .............................. A47C 31/00
(52) U.S. Cl. .................................. 297/216.12
(58) Field of Search ............... 297/408, 406, 297/407, 216.12, 403

(56) References Cited

U.S. PATENT DOCUMENTS

| | | |
|---|---|---|
| 2,582,571 A | 1/1952 | Thoma |
| 3,574,398 A | 4/1971 | Hairgrove |
| 3,623,768 A | 11/1971 | Capener |
| 4,042,791 A | 8/1977 | Wiseman |
| 4,205,878 A | 6/1980 | Wooten |
| 4,440,443 A | 4/1984 | Nordskog |
| 4,637,655 A * | 1/1987 | Fourrey et al. ............ 297/410 |
| 4,883,243 A | 11/1989 | Herndon |
| 4,899,961 A | 2/1990 | Herndon |
| 4,946,191 A | 8/1990 | Putsch |
| 5,370,446 A | 12/1994 | Bancod |
| 5,411,468 A | 5/1995 | Chen |
| 5,496,061 A | 3/1996 | Brown |
| 5,505,487 A | 4/1996 | Brown et al. |
| 5,531,505 A * | 7/1996 | Baetz et al. ............... 297/408 |
| 5,556,129 A | 9/1996 | Coman et al. |
| 5,752,742 A * | 5/1998 | Kerner et al. ............. 297/391 |
| 5,904,405 A | 5/1999 | Wu |
| 5,997,091 A * | 12/1999 | Rech et al. ................ 297/391 |
| 6,120,099 A * | 9/2000 | Reikeras et al. ........... 297/391 |
| 6,123,389 A | 9/2000 | O'Connor et al. |
| 6,220,668 B1 * | 4/2001 | Scheffzuck ................ 297/391 |
| 6,250,716 B1 * | 6/2001 | Clough ...................... 297/408 |
| 6,513,871 B2 * | 2/2003 | Bartels .................... 297/216.12 |

FOREIGN PATENT DOCUMENTS

| DE | 44 46 595 A1 | 12/1994 |
|---|---|---|
| GB | 2 300 391 A | 4/1996 |

* cited by examiner

Primary Examiner—Peter M. Cuomo
Assistant Examiner—Erika Garrett
(74) Attorney, Agent, or Firm—Bill C. Panagos

(57) ABSTRACT

A headrest assembly including a headrest pad having a front surface and side portions that are movable between a first position and a second position wherein the side portions are forward of the front surface of the headrest pad. A shift mechanism is provided for moving the side portion to the second position. A trigger is actuated in response to an impact that causes the shift mechanism to move the side portion from the first position to the second position. The headrest pad preferably has a central section that is flanked by right and left side portions. The side portions pivot on a shaft or hinge mechanism that includes a spring that biases the side portions toward the second position. The trigger is preferably a hook that is mounted on a slide secured to the headrest pad. A torsion spring is secured between the hook and the slide so that the hook may be displaced relative to the headrest pad when the impact exerts an inertial load to the headrest pad above a predetermined level. The right and left side portions may pivot independently relative to each other. A ratchet may be provided between the side portions and the headrest pad that permits the side portions to be locked in one of a plurality of angular positions relative to the headrest body. The headrest pad may alternatively have a central section that is flanked by right and left side portions that are shifted in a fore and aft linear direction independently relative to a central section.

8 Claims, 7 Drawing Sheets

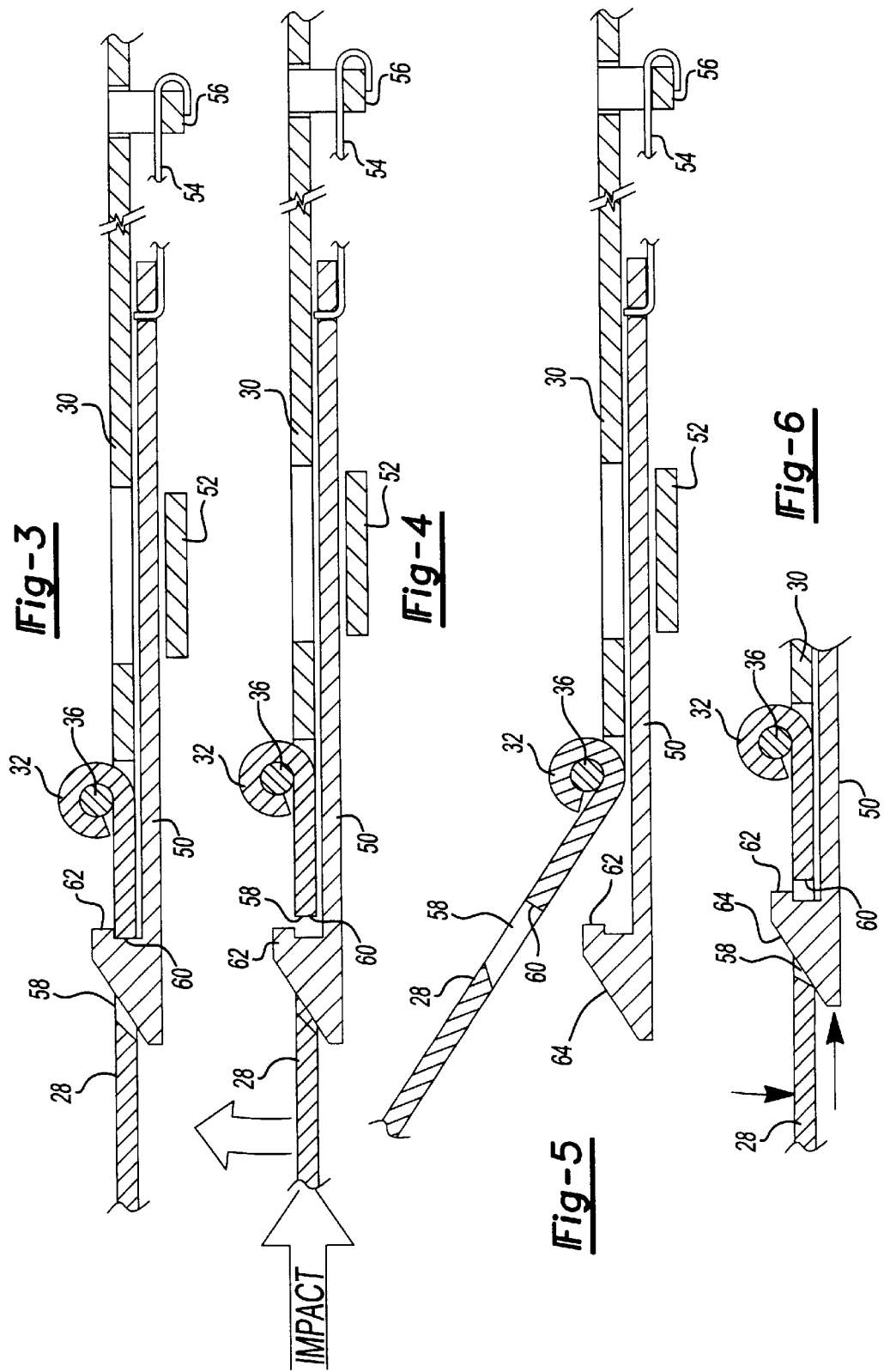

SIDE IMPACT ACTIVE HEAD RESTRAINT

BACKGROUND OF THE INVENTION

1. Field of the Invention

This invention relates to vehicle seat headrests having side portions that move in response to a side impact in a forward direction to provide lateral support for a seat occupant's head.

2. Background Art

Vehicle seats have head restraints that are generally provided for the purpose of protecting against front and rear impacts. Whether active or passive, prior art head restraints offer little protection in the event of a side impact. While the most common type of vehicle collisions are front and rear, side impacts and impacts that are combination side and front or rear (diagonal) impacts are also well known. Recently, side air curtains have been developed and are currently being implemented in new vehicles. While side air curtains may be beneficial in severe collisions, they are normally set to deploy in only relatively severe side impacts. Side air curtains also must travel approximately one foot between the side of the interior of the vehicle and the head of a passenger. Side air curtains must also deploy around the side of a vehicle seat that may be in a range of locations fore and aft in the vehicle.

Prior art headrests have been developed that include positionable or fixed wings on the sides of headrests. An example of one such system is disclosed in U.S. Pat. No. 6,123,389 that includes a fixed or manually positionable wing member that are attached to a back member.

Another approach to providing side support for a seat is disclosed in U.S. Pat. No. 4,205,878 that discloses a telescopic headrest member that is attached to either side of a backrest.

Another prior art headrest design is disclosed in U.S. Pat. No. 4,883,243 that discloses a headrest having a front wall that may be retracted toward a rear wall thereby allowing a pilot's head to be received between two rigid side walls of an ejection seat.

Another approach disclosed in U.S. Pat. No. 5,496,061 and U.S. Pat. No. 5,505,487 is to provide a side impact air bag module that is deployed from a headrest. The air bag module is normally retained in a cavity formed in the side of the headrest. The air bag is deployed by an inflator that drives the air bag module on a pair of guide rods to a position outboard of the headrest where upon the air bag may be deployed in the forward direction.

Static headrests with forwardly extending wing portions suffer from the disadvantage of confining a seat occupant's head at all times that can potentially impede visibility and may also make the vehicle occupant feel confined. Manually adjustable headrests are also generally passive devices that a user may defeat the purpose of by not positioning the side wings to extend forwardly. If the side wings are positioned to extend forwardly, they suffer from the same disadvantage of being confining and potentially blocking visibility described above.

Dynamic headrest devices such as the retractable front wall or air bag types of devices suffer from the disadvantage of being complex and expensive. Electronic controls, sensors, and actuators must be used to control these types of devices in the event of an impact.

These and other drawbacks and disadvantages associated with prior art headrests are addressed by applicant's invention as summarized below.

SUMMARY OF THE INVENTION

According to one aspect of the present invention, a vehicle headrest assembly is provided that includes a headrest pad having a front surface wherein at least one side portion of the headrest pad has a first position but that is shiftable in a forward direction to a second position forward of the front surface of the headrest pad. A shift mechanism is provided for moving the side portion from the first position to the second position. A trigger is provided that is actuated in response to an impact that causes the shift mechanism to move the side portion from the first position to the second position.

According to another aspect of the invention, the headrest pad may have a central section that is flanked by right and left side portions. One or two side portions may be provided that pivot on a shaft. The shift mechanism may be a spring that is mounted on the shaft for biasing the side portion toward the second position.

According to yet another aspect of the invention, the trigger may be a hook that is mounted on a slide that is secured to the headrest pad. A torsion spring may be secured between the hook and the slide. The hook is displaced when the impact exerts an inertial load to the headrest pad above a predetermined level.

Another feature of the invention is that the headrest pad may have right and left side portions that pivot independently relative to each other. The headrest pad may have a central section that is flanked by right and left side portions that are shifted fore and aft in a linear direction independently relative to the central section. A ratchet connection may be provided between the side portion or portions and the headrest pad that permits the side portion or portions to be locked in one of a plurality of angular positions relative to the headrest body. The trigger may be a hook that is mounted on a slide secured to the headrest pad with a torsion spring being secured between the hook and the slide. The hook may be displaced when an impact exerts an inertial load to the headrest pad above a predetermined level and wherein the torsion spring exerts a force on the shift mechanism that locks the side portion in one of the angular positions.

Other aspects of the invention will be better understood in view of the attached drawings and following detailed description of the invention.

BRIEF DESCRIPTION OF THE DRAWINGS

FIG. 3 is a cross-sectional view taken along the line 3—3 in FIG. 2;

FIG. 4 is a cross-sectional view similar to FIG. 3 but showing the initial stage of the latch release upon impact;

FIG. 5 is a cross-sectional view similar to FIG. 3 but showing the latch releasing a side support plate;

FIG. 6 is a cross-sectional view similar to a portion of FIG. 3 showing the side support plate re-engaging the latch;

DETAILED DESCRIPTION OF THE PREFERRED EMBODIMENT(S)

Figure 1:
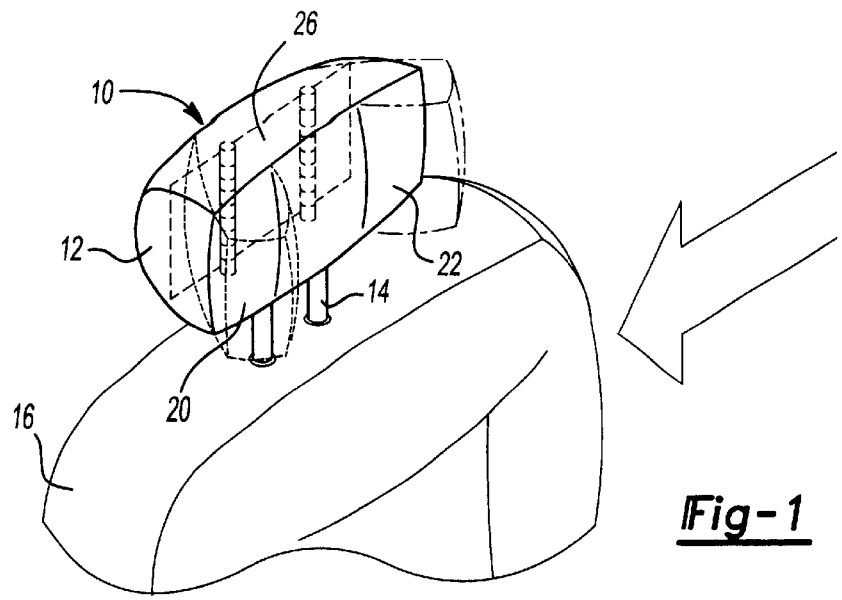
FIG. 1 is a fragmentary perspective view of a vehicle seat having a headrest assembly made in accordance with the invention.

Referring now to FIG. 1, a headrest assembly generally indicated by reference numeral 10 is shown to include a headrest pad 12 supported on support bars 14 that are extensible from a vehicle seat 16. The headrest assembly 10 includes a right side portion 20 and a left side portion 22 that are shown in phantom lines in FIG. 1 with the right and left side portions 20, 22 shifted forwardly from their normal position shown in solid lines. A central section 26 of the headrest assembly 10 is provided between the right side portion 20 and the left side portion 22.

Figure 2:
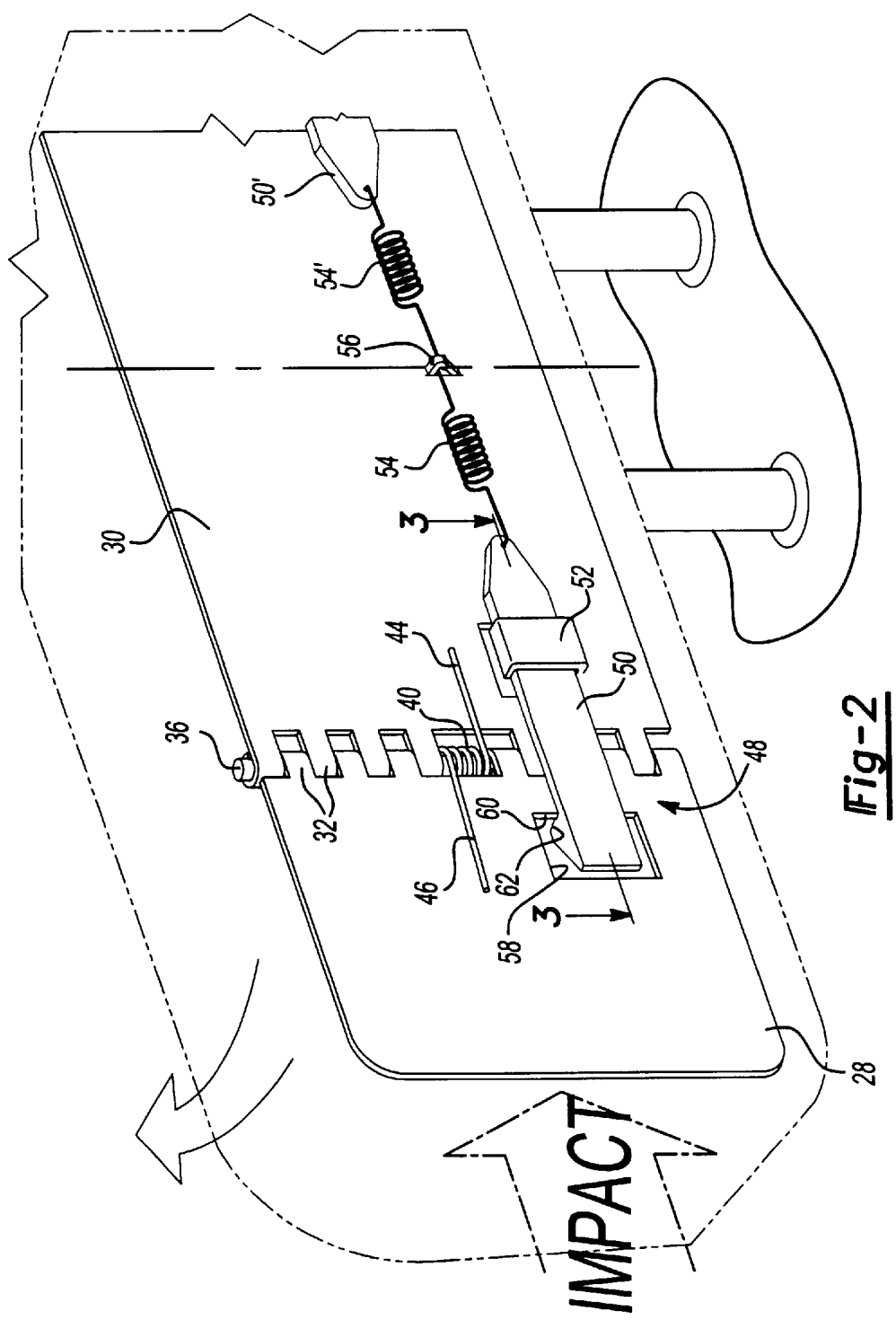
FIG. 2 is a fragmentary rear perspective view of headrest support plates connected by a hinge and latch in accordance with the invention.

Referring now to FIG. 2, the supporting structure of the headrest assembly 10 is shown to include a side support plate 28 and a central support plate 30. The side and central support plates 28, 30 include inner-engaged hinge flanges 32 that are connected by a hinge pin 36 so that the side support plate 28 is pivotally connected to the central support plate 30.

A spring 40 is mounted on the hinge pin 36 and includes an anchoring leg 44 that engages the central section 26 and a biasing leg 46 that engages the side support plate 28. A latch mechanism generally identified by reference numeral 48 includes a hook 50 that is retained in a slide guide 52. Hook 50 is slidably received in the slide guide 52 and is biased to the right as shown in FIG. 2 by a torsion spring 54. Torsion spring 54 is a relatively small spring that exerts a minimal biasing force on the hook 50. The torsion spring 54 is connected to the hook 50 on one end and to an anchor 56 that is secured to the central support plate 30. The hook 50 is received in an opening 58 formed in the side support plate 28 so that an inner edge 60 of the opening 58 receives a hook lip 62. The torsion spring 54 biases the hook lip 62 to engage the inner edge 60 of the opening 58 so that the side support plate 28 is normally held in the same plane as the central section 26. When impacted as shown by the arrow on the left side of FIG. 2, the latch mechanism 48 releases as will be described in more detail with reference to FIGS. 3–5 below.

Referring now to FIG. 3, the latch mechanism 48 is shown holding the side support plate 28 and the center support plate 30 in their normal planar alignment. The torsion spring 54 is connected to the anchor 56 and exerts a biasing force on the hook 50. Hook 50 is movable within the slide guide 52. Hook lip 62 engages the inner edge 60 of the opening 58. Hook lip 62 prevents spring 40, shown in FIG. 2, from moving the side support plate 28.

Referring now to FIG. 4, upon impact shown by the arrow at the left side of FIG. 4, the vehicle seat 16 is displaced in the same direction as the impact while the torsion spring 54 allows the hook 50 to act as a free body wherein it remains stationary as the side and central support plates 28, 30 move to the right. This slight movement allows the hook lip 62 to release the inner edge of the opening 58. When this occurs, the side support plate 28 is urged in the direction shown by the unlabeled arrow on the left side of FIG. 4.

Referring now to FIG. 5, the side support plate 28 is shown shifted forwardly by the action of the spring 40. Biasing leg 46 engages the side support plate 28 to drive it forwardly into the position shown in FIG. 5. The movement of the side support plate 28 in the forward direction allows the left side portion 22 of the headrest assembly 10 to move to the position shown in FIG. 1 and thereby provide support for the head of a person sitting in the vehicle seat 16.

Referring now to FIG. 6, the latch mechanism 48 may be re-engaged to place the headrest assembly 10 back to its normal position with the side support plate 28 and central support plate 30 in a planar alignment. A ramp surface 64 is provided on the hook 50 so that when the side support plate 28 is moved back to its original position in the direction shown by the arrow pointing toward the surface of the side support plate 28, the hook 50 is driven to the right as shown in FIG. 6 until the hook lip 62 again engages the inner edge 60 of the opening 58.

Figure 7:
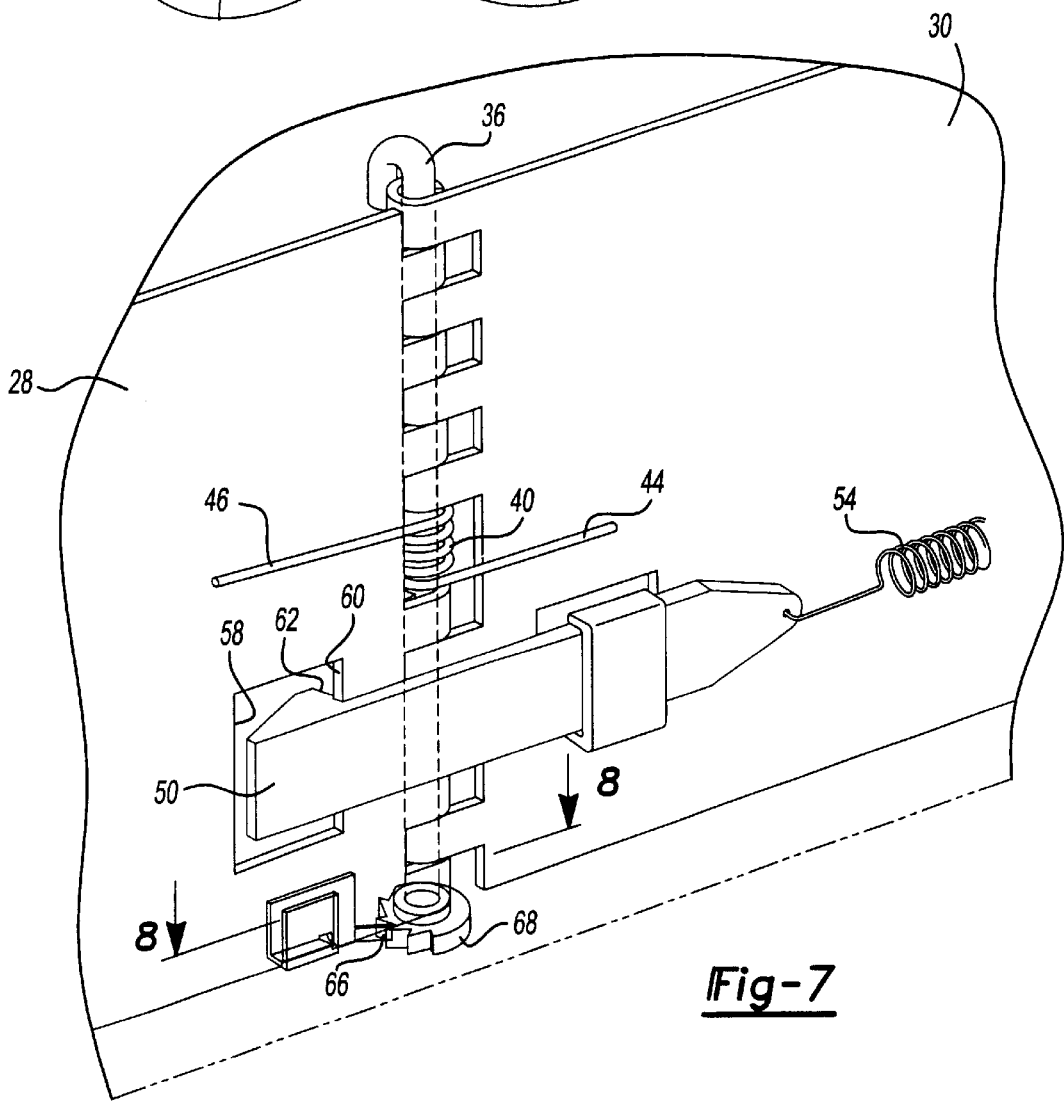
FIG. 7 is a fragmentary rear perspective view of an alternative embodiment of a headrest assembly made in accordance with the present invention having a ratchet and pawl.

Referring now to FIG. 7, an alternative embodiment of the present invention is shown wherein the same reference numerals will be used for similar elements described with reference to the embodiment of FIGS. 1–6. The hook 50 engages the opening 58 with the hook lip 62 being biased against the inner edge 60 of the opening 58 by means of the torsion spring 54. The spring 40 is secured to the hinge pin 36 with the anchoring leg 44 engaging the central support plate 30 and the biasing leg 46 engaging the side support plate 28. A pawl 66 and ratchet gear 68 allow the side support plate 28 to be moved within a range of angular positions about the hinge pin 36 depending upon whether the vehicle seat occupant's head contacts the forwardly moving side portion of the headrest assembly 10. When the head of an occupant contacts the right or left side portion 20, 22 of the headrest assembly 10, the pawl 66 locks in place by engaging the ratchet gear 68.

Figure 8:
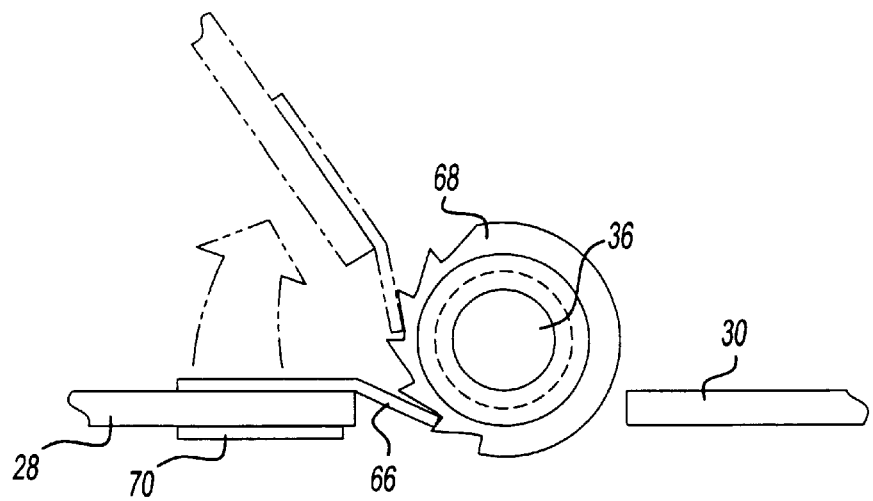
FIG. 8 is a schematic plan view taken along the line 8—8 in FIG. 7 of the ratchet and pawl.
Figure 9:
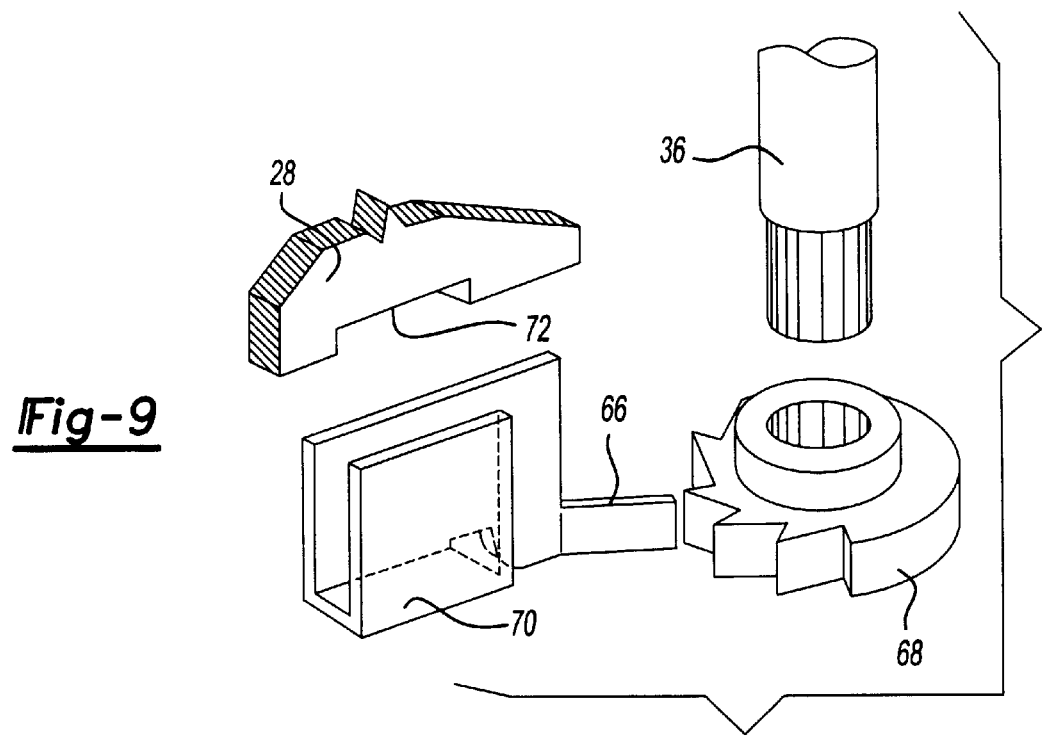
FIG. 9 is an exploded perspective view of the ratchet and pawl shown in FIG. 7.

Referring now to FIGS. 8 and 9, the pawl 66 and ratchet gear 68 are shown in greater detail. The ratchet gear 68 is received on the lower end of the hinge pin 36. The pawl 66 is formed as an extension from a clip 70 that is secured to a notch 72 formed in the lower surface of the side support plate 28. Upon impact, as shown in FIG. 8, the side support plate 28 rotates as shown by the arrow shown by a phantom line in FIG. 8. Rotation of the side support plate 28 is limited by the severity of the impact and point at which the head of a vehicle seat occupant contacts the headrest assembly 10. Upon contact, the movement of the side portion 20 or 22 stops and the pawl 66 locks in place on the ratchet gear 68.

Figure 10:
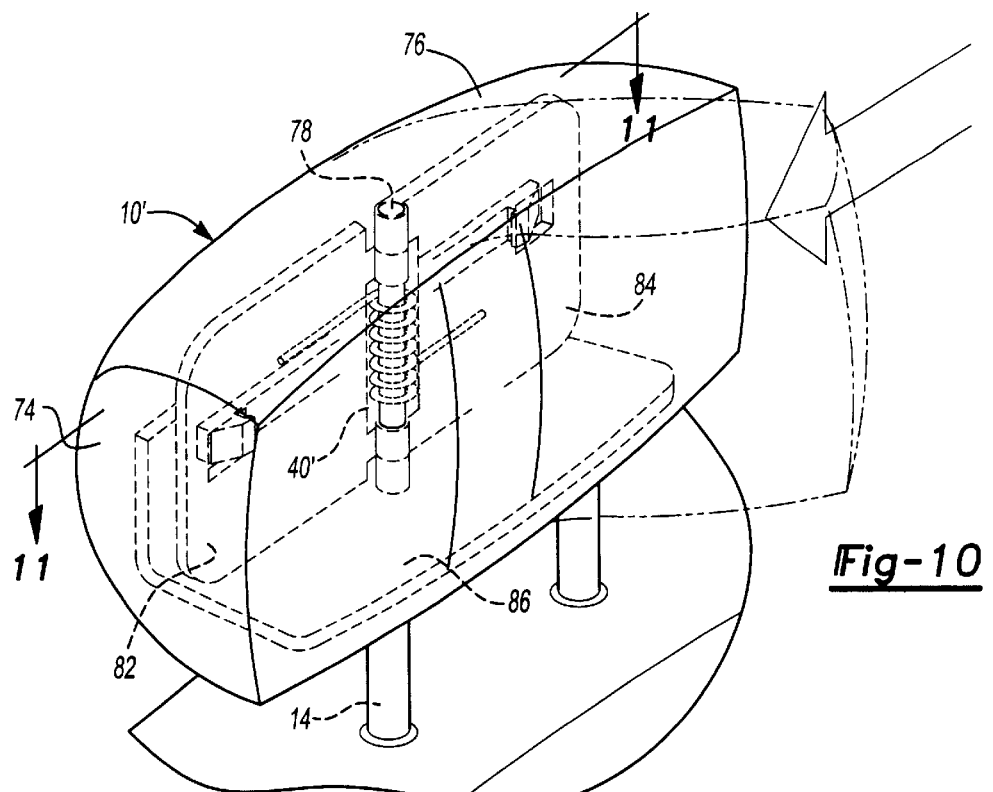
FIG. 10 is a front perspective view of an alternative embodiment of a headrest assembly.
Figure 11:
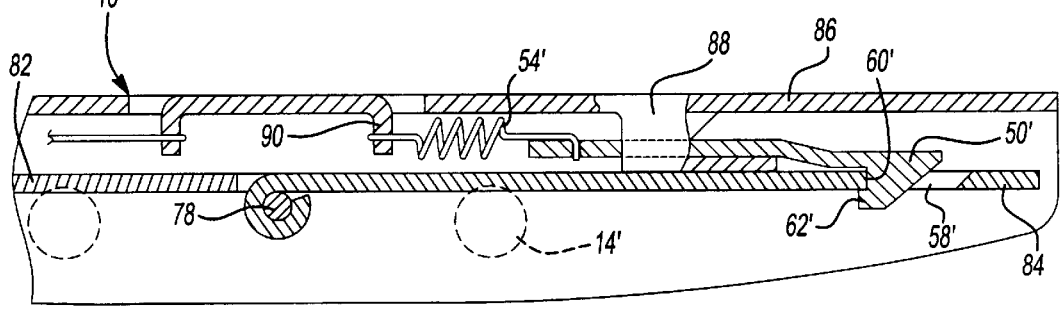
FIG. 11 is a cross-sectional view taken along the line 11—11 in FIG. 10.
Figure 12:
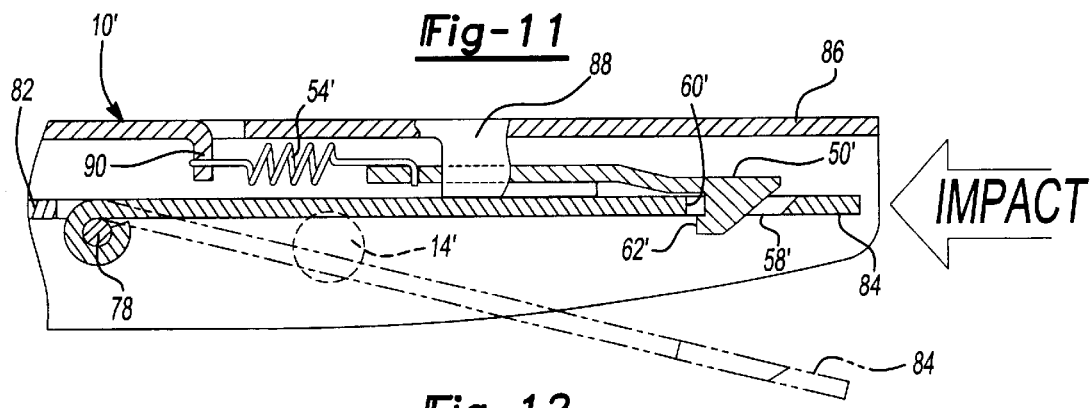
FIG. 12 is a partial cross-sectional view similar to FIG. 11 but showing the initial stage of the latch releasing upon impact with a side support plate in a released position in phantom lines.

Referring now to FIGS. 10 through 12, another alternative embodiment of the present invention is shown wherein the headrest assembly 10' is shown to include a right section 74 and a left section 76 that are both mounted on a central pivot shaft 78.

Referring now to FIGS. 11 and 12, the headrest assembly 10' of FIG. 10 is shown in its pre-release position in FIG. 11 and is shown as it reacts to an impact with the side support plate 84 shown in phantom being released from the hook 50' in FIG. 12. Referring to FIG. 11, the side support plate 84 is the left hand side support plate, while the right support plate 82 extends from the opposite side of the central pivot shaft or hinge pin 78. The hook 50' is received in the opening 58'. The headrest support 86 may be secured to the bars 14' to a vehicle seat. The headrest support 86 and slide guide 88 limit movement of the hook 50'. Hook 50' is biased into engagement with the inner edge 60' of the opening 58' and is held in place by means of the hook lip 62'.

Referring now to FIG. 12, upon impact, as shown by the arrow on the right side of FIG. 12, the vehicle seat including the left support plate 84 moves to the right while the hook 50' acts as a free body because it is connected to the anchor 90 by means of the spring 54'. When the hook lip 62' clears the inner edge 60 of the opening 58, the left support plate 84 is driven by the spring 40' shown in FIG. 10 forwardly as shown in phantom lines in FIG. 12.

Figure 13:
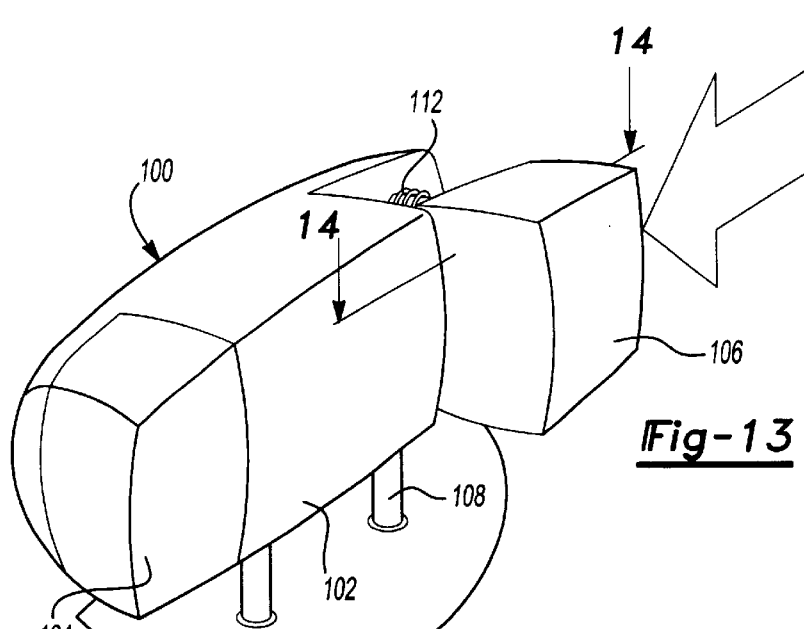
FIG. 13 is a front perspective view of another alternative embodiment of a headrest assembly.

Referring now to FIG. 13, an alternative embodiment of a headrest assembly 100 is shown that includes a central headrest portion 102 and right and left side portions 104 and 106. The central portion 102 is secured by bars 108 to a vehicle seat 110 and spans the back of the headrest assembly 100. As shown in FIG. 13, the left side portion 106 is shown in an extended position to provide lateral support for a person's head seated in the vehicle seat 110 in the event of an impact from the left side as shown by the arrow on the right side of FIG. 13. A helical spring 112 biases the side portion 106 to its extended position whenever an impact causes the latch mechanism to be released as will be described below.

Figure 14:
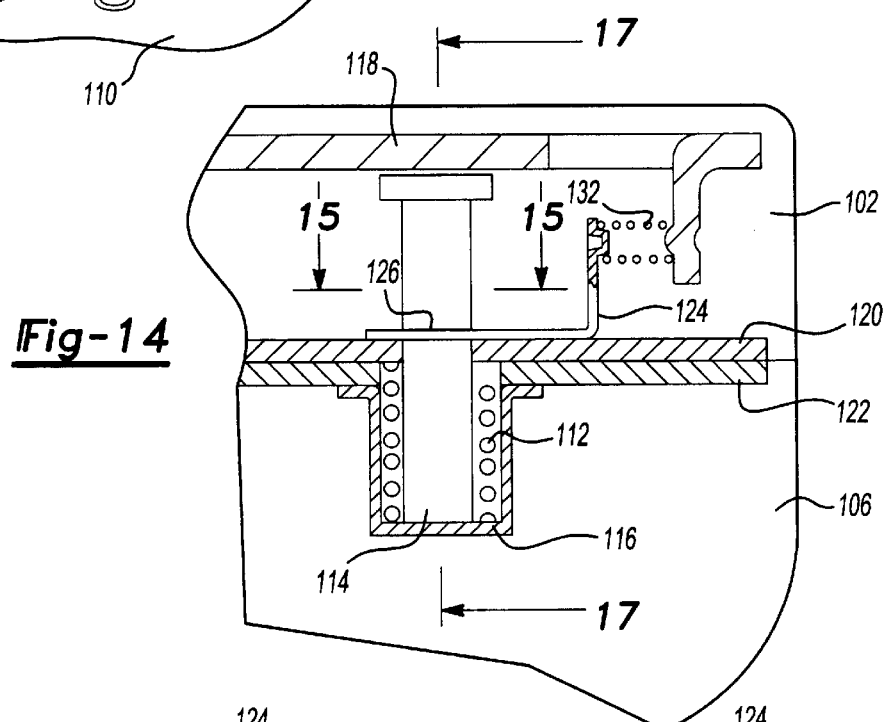
FIG. 14 is a cross-sectional view of another latch taken along the line 14—14 in FIG. 13.

Referring now to FIG. 14, the latch mechanism of the headrest assembly 100 is shown in greater detail. Both right and left sides have mirror image latch mechanisms. For brevity, only the left side will be described herein. The headrest assembly 100 includes the central portion 102 and the left side portion 106. The spring 112 is received on a guide pin 114 and maintained in a compressed condition when the left side portion 106 is in its normal non-extended position. A retainer cup 116 is provided to retain one end of the pin 114 and spring 112 within the left side portion 106. The central portion 102 includes a central section support plate 118 that extends across the back of the headrest assembly 100. A face plate 120 and backing plate 122 are provided on the central portion 102 and left side portion 106, respectively, in a face-to-face relationship. Latch clip 124 is slidably mounted on the face plate 120 and is releasably received in a groove 126 formed in the guide pin 114.

Figure 15:
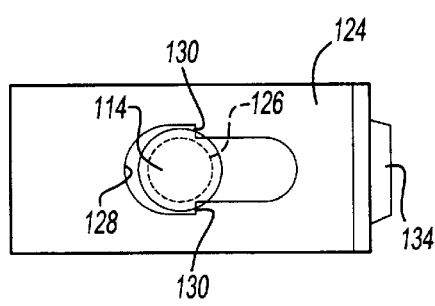
FIG. 15 is a cross-sectional view taken along the line 15—15 in FIG. 14.
Figure 16:
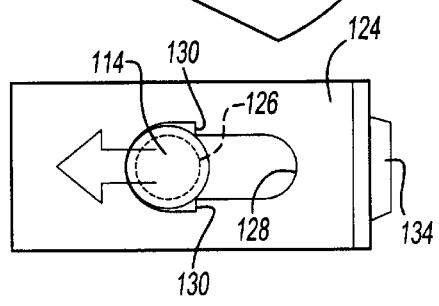
FIG. 16 is a cross-sectional view similar to FIG. 15 but showing the latch releasing.

Referring now to FIGS. 15 and 16 with continued reference to FIG. 14, a key hole slot 128 is formed in the latch clip 124. The key hole slot 128 receives the guide pin 114 with a pair of shoulders 130 of the key hole slot 128 being received in the groove 126 to hold the guide pin 114 in its retracted position. A spring 132 supports the latch clip 124 as a free body relative to the headrest assembly 100 and in particular the guide pin 114. Upon impact, as indicated by the arrow in FIG. 16, the latch clip moves to a release position shown in FIG. 16 when the shoulders 142 are shifted out of the groove 126. As shown in FIG. 15 in the latch position, the shoulders 130 engage the groove 126. The spring 132 is retained on a boss 134 formed on the retainer clip 116 to maintain a slight pressure biasing the latch clip 124 toward the pin 114 so that the shoulders 130 remain in the groove 126 until an impact occurs.

Figure 17:
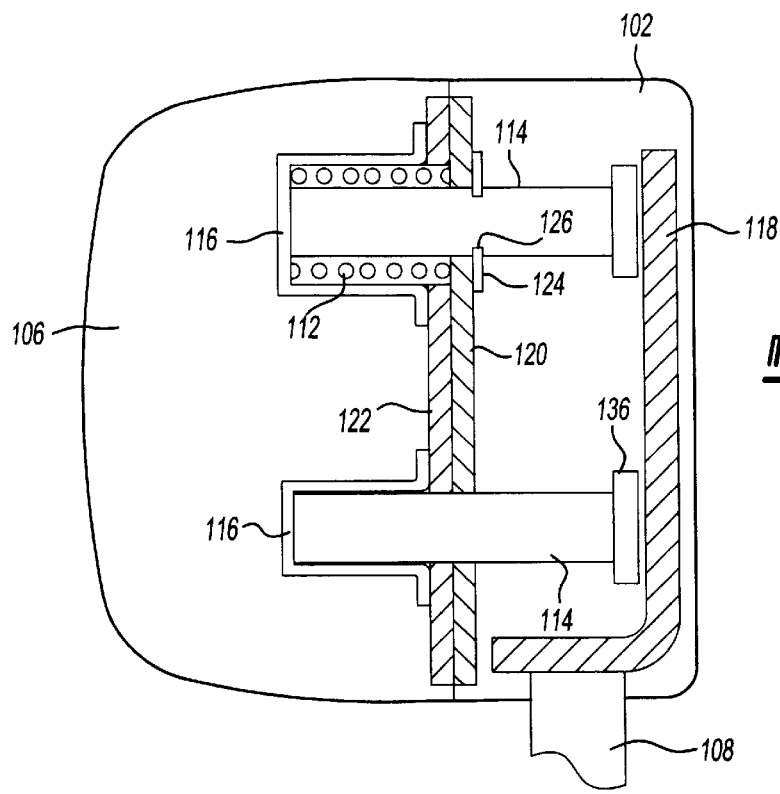
FIG. 17 is a cross-sectional view of the latch and guide pins taken along the line 17—17 in FIG. 14.
Figure 18:
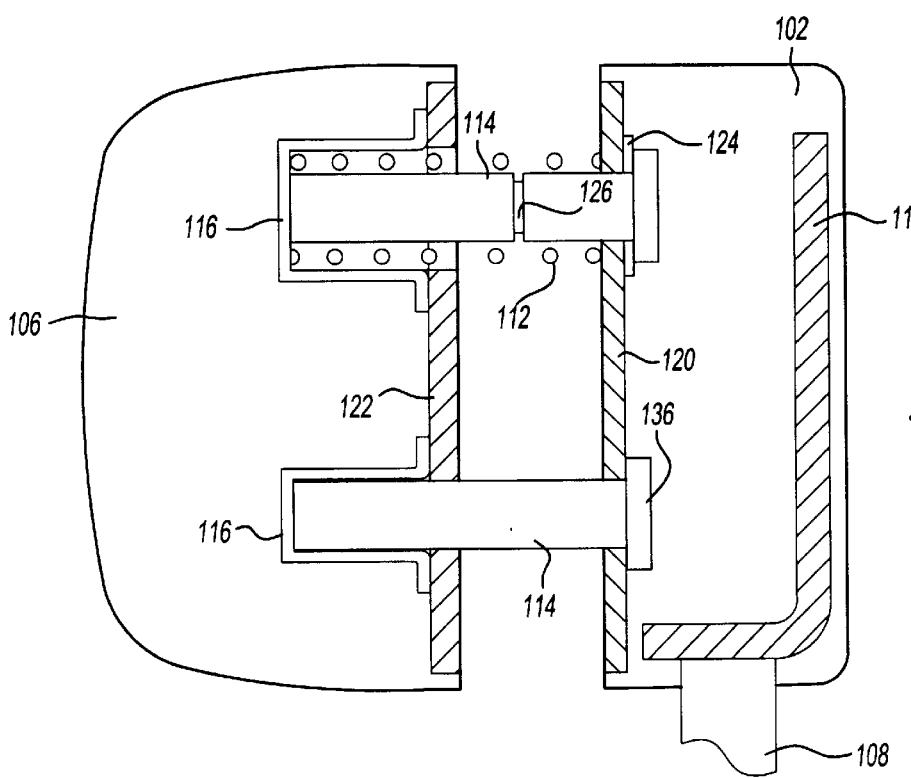
FIG. 18 is a cross-sectional view similar to FIG. 17 but showing the latch released and guide pins in an extended position.

Referring now to FIGS. 17 and 18, the left side portion 106 is shown in its retracted and extended positions, respectively. In the retracted position, the left side portion 106 abuts the central portion 102. The latch clip 124 is received in the groove 126 with a head portion 136 adjacent the central section support plate 118. Two guide pins 114 are shown with one guide pin having a latch and spring mechanism while the other guide pin is a passive pin used to guide movement of the left side portion 106. Retainer cups 116 are provided in the left side portion 106 to retain the guide pins 114. The face plate 120 and backing plate 122 are in a face-to-face abutting relationship.

Upon impact, the left side portion 106 moves to the position shown in FIG. 18. The guide pins 114 are extended from the face plate 120 until the head portions 136 engage the back side of the face plate 120. The left side portion 106 is thereby shifted at the central portion 102 as shown in FIG. 13.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle headrest assembly comprising:

a headrest pad having a front surface;

a side portion of the headrest pad having a first position, the side portion being shiftable in a forward direction to a second position forward of the front surface;

a shift mechanism for moving the side portion from the first position to the second position; and a trigger actuated in response to a vehicle impact that causes the shift mechanism to move the side portion from the first position to the second position;

wherein a ratchet connection is provided between the side portion and the headrest pad that permits the side portion to be locked in one of a plurality of angular positions relative to the headrest pad, the trigger is a hook mounted on a slide that is secured to the headrest pad, and a torsion spring is secured between the hook and the slide, so that when the vehicle impact exerts an inertial load to the headrest pad above a predetermined level the hook is displaced and the torsion spring exerts a force on the shift mechanism that locks the side portion in one of the angular positions.

2. The vehicle headrest assembly of claim 1 wherein the headrest pad has a central section that is flanked by right and left side portions.

3. The vehicle headrest assembly of claim 1 wherein the side portion pivots on a shaft.

4. The vehicle headrest assembly of claim 3 wherein the shift mechanism is a spring mounted on the shaft for biasing the side portion toward the second position.

5. The vehicle headrest assembly of claim 4 wherein the trigger is a hook that is mounted on a slide secured to the headrest pad, a torsion spring being secured between the hook and the slide, and wherein the hook is displaced when the impact exerts an inertial load to the headrest pad above a predetermined level.

6. The vehicle headrest assembly of claim 1 wherein the headrest pad has a right and left side portions that pivot independently relative to each other.

7. The vehicle headrest assembly of claim 1 wherein the headrest pad has a central section that is flanked by right and left side portions that are shifted fore and aft in a linear direction independently relative to the central section.

8. A vehicle headrest assembly comprising:

a headrest pad having a front surface;

a side portion of the headrest pad having a first position, the side portion being shiftable in a forward direction to a second position forward of the front surface;

a shift mechanism for moving the side portion from the first position to the second position; and a trigger actuated in response to a vehicle impact that causes the shift mechanism to move the side portion from the first position to the second position;

wherein the side portion pivots on a shaft, the shift mechanism is a spring mounted on the shaft for biasing the side portion toward the second position, the trigger is a hook mounted on a slide secured to the headrest pad, the trigger being displaced when the impact exerts an inertial load to the headrest pad above a predetermined level, and a torsion spring is secured between the hook and the slide.

* * * * *